Nov. 4, 1969   A. L. BLYTHE   3,477,014
ELECTRICAL CONTROL SYSTEMS WITH STABILIZING CONTROL MEANS
Filed April 6, 1967

WITNESSES:
Leon M. Garman
James F. Young

INVENTOR
Allan L. Blythe
BY
Donald R. Lackey
ATTORNEY

United States Patent Office 3,477,014
Patented Nov. 4, 1969

3,477,014
ELECTRICAL CONTROL SYSTEMS WITH STABILIZING CONTROL MEANS
Allan L. Blythe, Burlington, Ontario, Canada, assignor to Canadian Westinghouse Company, Limited, Hamilton, Ontario, Canada
Filed Apr. 6, 1967, Ser. No. 629,026
Claims priority, application Canada, Aug. 9, 1966, 967,439
Int. Cl. H02h 7/06
U.S. Cl. 322—19                     4 Claims

ABSTRACT OF THE DISCLOSURE

An electrical control system for stabilizing dynamoelectric machines when they are operating under abnormal conditions. The electrical control system provides a stabilizing signal responsive to the integral of the deviation of the instantaneous real power output from the steady-state real power output of the dynamoelectric machine, and adds this stabilizing signal to the signal from the voltage regulator. During normal operating conditions, the voltage regulator controls the excitation of the dynamoelectric machine, as the stabilizing signal is negligible. During system disturbances, the stabilizing signal increases to override the action of the voltage regulator and dampen oscillations of the rotor of the dynamoelectric machine.

BACKGROUND OF THE INVENTION

Electric power transmission systems have two generally recognized stability load limits which may be referred to as "steady state" and "transient" limits respectively. The steady state stability limit is the maximum amount of a steadily applied load which a system can carry under steady state conditions without causing instability or loss of synchronism between the synchronous machines at the various locations throughout the system. The transient stability limit is the maximum amount of load a system can carry without causing instability or loss of synchronism of the machines under conditions of large disturbances in the transmission system such as are caused by short or open circuits, suddenly applied loads and the like.

When a synchronous alternating current generator supplies power to a system the rotor is continually subjected to small disturbances since the load is continually changing. As the average steady state load of the generator is increased these disturbances have an increasing effect on the oscillations of the rotor about its steady state position until the load is increased to the point where the generator loses synchronism with the rest of the system. This is the steady state stability limit of the machine.

The steady state and transient stability of a generator may be increased by improving the performance of the excitation system supplying the synchronous generator or the stability of the generator may be similarly increased by decreasing the transient reactance.

SUMMARY OF THE INVENTION

The present invention, however, relates to improvement in generator stability as a result of the improvement in performance of the regulator system. This improvement results from the use of a solid state exciter system when used in conjunction with a stabilizing feedback signal taken from the output of the generator.

Ideally a transducer is connected to the output of the synchronous generator to supply a signal which is proportional to the output power being delivered from the machine. This voltage output is passed through a delay circuit so as to store the signal proportional to the average steady state power being delivered by the generator. This signal which is proportional to the average steady state power is then used as a reference from which the instantaneous power signal is subtracted. The resulting difference signal ($\Delta P$) is thus proportional to the instantaneous deviation of the power output from the average power output.

Next the $\Delta P$ signal is integrated to provide another signal $\int \Delta P$ proportional to the summation of the deviation of the instantaneous power output from the average output power.

The $\Delta P$ signal and the $\int \Delta P$ signal are attenuated or amplified in a suitable manner so as to produce a final signal which is produced by the addition of the suitably attenuated $\Delta P$ signal and the $\int \Delta P$ signal to produce the desired feedback signal. This signal is fed back to the exciter system in such a manner that under decreasing output power conditions, the stabilizing signal attempts to increase the excitation of the machine.

BRIEF DESCRIPTION OF THE DRAWINGS

A more detailed description follows which will enable a better understanding of my invention when taken with reference to the following drawings, in which.

DESCRIPTION OF THE PREFERRED EMBODIMENTS

Figure 1:
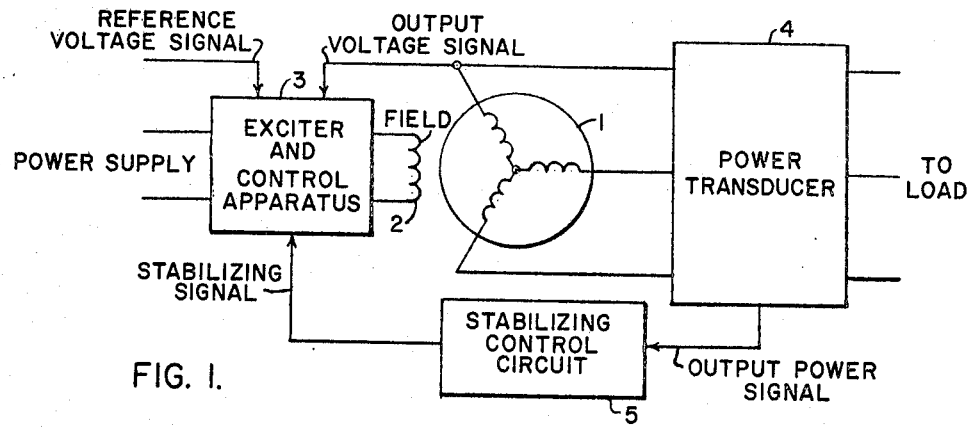
FIGURE 1 is an illustration of a synchronous generator to which the stabilizing circuit has been applied.

FIGURE 1 shows how the invention may be used in conjunction with an alternating generator whose excitation is supplied with a high speed static type exciter. This type of exciter utilizes controlled rectifiers and as a result the response time is much, much less than the response time of conventional excitation systems which use a rotating machine to supply the excitation.

The standard three phase alternator 1 is shown having a field 2. The field is supplied by a high speed exciter 3 which also includes the control circuitry for the exciter system. The output of the machine is monitored by a power transducer 4 the function of which is to produce a signal output which is proportional to the instantaneous power output. Any transducer which will produce a voltage signal proportional to the active power output delivered by the alternator will be acceptable providing the transducer has no appreciable phase lag.

The output voltage of the power transducer is fed into the stabilizing control circuit 5 where the output power signal is modified and integrated etc. until the desired stabilizing signal is produced.

The stabilizing signal is then fed into the exciter control circuit where it is combined with the reference voltage and the output voltage feedback signal to produce a signal upon which the excitation of the alternator depends.

Figure 2:
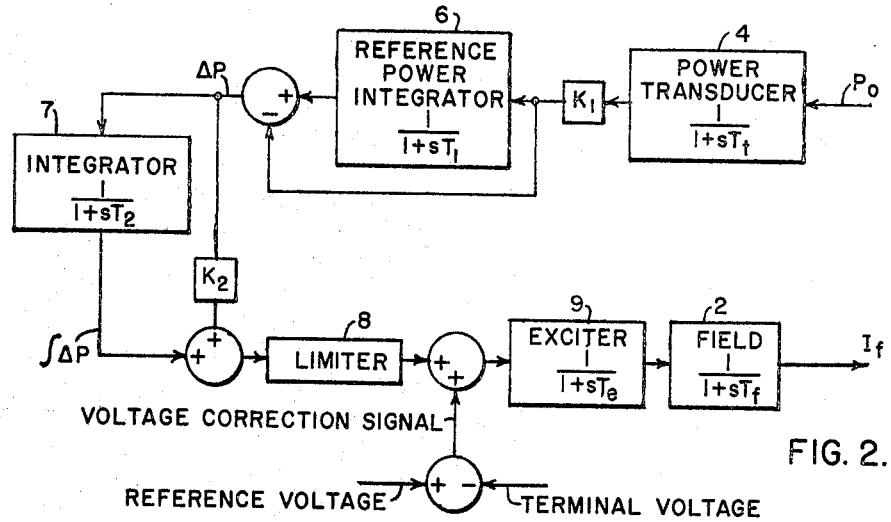
FIG. 2 is a block diagram showing the various elements in the control circuit.

The actual manner in which the stabilizing signal is obtained and modified is shown in FIGURE 2 where the output power of the alternator is shown being fed into the power transducer 4. The power transducer is shown as a device having a short time delay, the time constant of the transducer being $T_t$ where the $T_t$ time constant is very small with respect to the time constants of the balance of the apparatus in the system. The output voltage of the transducer is then amplified by a factor $K_1$ (the value of $K_1$ will be determined later) and is supplied to the Reference Power Integrator 6.

The value of $T_1$ in the Reference Power Integrator will be determined later. The output signal from the Reference Power Integrator will be proportional to the steady state output power of the alternator as opposed to the amplified instantaneous power signal $K_1 \times Po$ which is fed into the Reference Power Integrator.

The steady state power signal is then fed into a comparing device where the amplified instantaneous power signal $K_1 \times Po$ is subtracted from it. The resultant signal $\Delta P$ which is the difference between the instantaneous output power and the steady state output power is in one circuit attenuated by a potentiometer by a factor $K_2$ and, in another circuit approximately integrated by a delay circuit 7 having a time constant $T_2$. The value of $T_2$ will be determined later. The value of the signal leaving the Integrator 7 will be designated $\int \Delta P$. The two signals $K_2 \Delta P$ and $\int \Delta P$ are then combined in an adder and passed through a limiter 8. A voltage correction signal is derived by comparing the output voltage as a feedback signal with an appropriate reference voltage in FIGURE 2 and modified by various other controls normal to automatic voltage regulators. The resultant voltage correction signal is added to the stability signal as shown in FIGURE 2. It is believed that this procedure is quite standard and will not be dealt with in any greater detail. The output signal from the adder is used to control the exciter so as to control the supply of field current to the machine. It will be understood that under normal circumstances the stability signal will add a negligible effect and control of the exciter will be by the voltage correction signal.

The exciter 9 is shown as a time delay circuit having a very small time constant $Te$ when compared to the time constant of the alternator field circuit.

Lastly, the output from the exciter 9 is fed into the field circuit 2 of the alternator, so as to supply the proper excitation to the machine. It will be noted that the stability signals and the voltage signal will be in opposition for most periods except during fault conditions. That is for a small increase in output power the $Po$ and $\Delta Po$ signals are fed into the adder as negative signals and assuming a terminal voltage drop with the increase in output power the voltage correction signal would be a more positive one, thus the signals are in opposition.

The main portion of the stabilizing signal will be that portion of the power error signal which is passed through integrator 7. This is called the stability signal. The component of the power error signal supplied to the adder through potentiometer $K_2$ makes a smaller overall contribution than does the stability signal $\int \Delta P$ but the $K_2 \Delta P$ signal is useful as it does provide some compensation for time delays in the power transducer and the exciter.

The stability signal is made strong enough to override the voltage correction signal during a transient disturbance whereas under normal operating conditions the Instantaneous Power Signal and the Reference Power Integrator Signal are equal so that control is maintained by the voltage comparison circuit.

In order to compute the various optimum values for the time constants and the multipliers or gains K etc., it is necessary to know the period of oscillation of the generator. Generally this information can be obtained experimentally if the generator is installed or it may be calculated or computed approximately if the installation of the generator has not been made.

However, no matter what the period of oscillation of the generator is, nothing can be done to adjust the time constants $T_t$, $T_E$ and $T_F$ as these are probably the minimum design values in the first place.

We are given some choice in the selection of $T_1$ and $T_2$ and $K_1$ and $K_2$ logic for the choice is as follows:

From FIGURE 2:

$$I_t = \left(\frac{1}{1+sT_t}\right)(K_1)\left(\frac{1}{1+sT_1}-1\right)\left(K_2+\frac{1}{1+sT_2}\right)\left(\frac{1}{1+sTe}\right)\left(\frac{1}{1+sT_t}\right)Po$$

$$\frac{I_t}{Po} = \frac{[S(T_1K_1K_2+T_1K_1)+S^2T_1T_2K_1K_2]}{(1+sT_t)(1+sT_1)(1+sT_2)(1+sTe)(1+sT_t)}$$

Having the approximate transfer function relating $I_t$ and $Po$ it is now possible to obtain some values for $T_1$ and $T_2$ and K values.

The overall gain necessary depends on the inertia constant of the generator, the ceiling voltage of the exciter and a number of other factors associated with the transmission system. This will determine the value of $K_1$.

It is advantageous that the time constants $T_1$ and $T_2$ be made as small as possible so that the stabilizing signal returns to zero in the shortest possible time after a disturbance in the system.

In order that a time delay function $$\frac{1}{1+sT}$$

should represent integration sufficiently accurately, T must be very large and the function $$\frac{1}{1+sT} \approx \frac{1}{sT}$$

Thus good integration is achieved but the gain is deteriorated by a factor $1/T$. If T is large compared to the period of oscillation of the generator, the output will be almost constant at the average value of the input. Of course, as T is reduced, the gain increases and the function becomes less and less close to a pure integration.

Thus for the Integrator, $T_2$ should be fairly large e.g. possibly 10 seconds. However, if it is reduced the net effect will be to reduce the $\int \Delta P$ signal (which can be corrected by increasing the value of $K_1$) and to change the phasing of the stability signal (which may be corrected by changing $K_2$).

In experimental studies with this system it has been found that $T_1$ may be made as small as half the period of oscillation of the generator and $T_2$ about 1.5 times the same period of oscillation of the generator. A modification described later permits larger values to be used.

When values of $T_1$ and $T_2$ have been established the optimum value of $K_2$ can be calculated. The response of the transfer function, obtained previously, to a sinusoidal oscillation of $Po$ equal to $P$ sine $wt$ may be calculated by substituting $jw$ for $s$ $$I_t = \frac{-jw\left\{1+jw\frac{K_2T_2}{(1+K_2)}\right\}(K_1)(1+K_2)(T_1)P \text{ sine } wt}{(1+jwT_tP)(1+jwT_1)(1+jwT_2)(1+jwTe)(1+jwT_t)}$$

where $w$ is the frequency of oscillation in radians/sec.

The angle of lag of the vector $I_t$ behind $Po$ as calculated from normal vector analysis is Arctan $(wT_t)$+Arctan $(wT_1)$+Arctan $(wT_2)$+Arctan $(wTe)$+Arctan $(wT_t)$+90°−Arctan $\frac{wK_2T_2}{1+K_2}$ The instantaneous power output of the alternator is directly proportional to the internal voltage which of course is proportional to field current. Immediately after a transient the power output must be increased to provide the greatest deceleration of the rotor. If it is possible the field current should be exactly in phase with the power output.

Thus $$\text{Arctan}\left\{\frac{(wK_2T_2)}{1+K_2}\right\} = \text{Arctan }(wT_t) + \text{Arctan }(wT_1)$$
$$+ \text{Arctan }(wT_2) + \text{Arctan }(wTe) + \text{Arctan }(wT_t) + 90°$$

$K_2$ should be readily obtained from the above equation. It is noted that since the period of oscillation is partly dependent on the transmission system and may vary over a small range depending on the particular switching situation. Therefore, there is no need to make the phasing of I and Po exact.

The above system may be slightly modified so that the stabilizing signal does not undergo large changes in amplitude for changes in input power i.e. when the gates (or valves) are opened on the turbine of the generator the stability signal acts in such a manner as to temporarily lower the terminal voltage for an increased power input and output. To compensate for changes in power input to the machine it is necessary to sample the gate position and supply a signal according to the position of the turbine gate.

It is quite straightforward to use a potentiometer which is supplied with a constant voltage whose slider thus carries a voltage proportional to gate opening, which is proportional to the input power of the generator. This signal is adjusted in a suitable manner and subtracted from the power signal from the power transducer. The resultant is fed to the amplifier $K_1$ and treated as before. Thus for an increase in the input power to the generator the gate signal increases as the output power increases and the difference produces only a very small stability signal, which in turn produces only minor changes in terminal voltage. Adjustment of the gate signal can cause the minor voltage variations to be in the more desirable direction, i.e. increased terminal voltage for increased input power.

The use of the gate signal reduces the need for using small values of $T_1$ and $T_2$. These may then be adjusted to the more desirable level of several times the natural period of oscillation of the generator.

Figure 3:
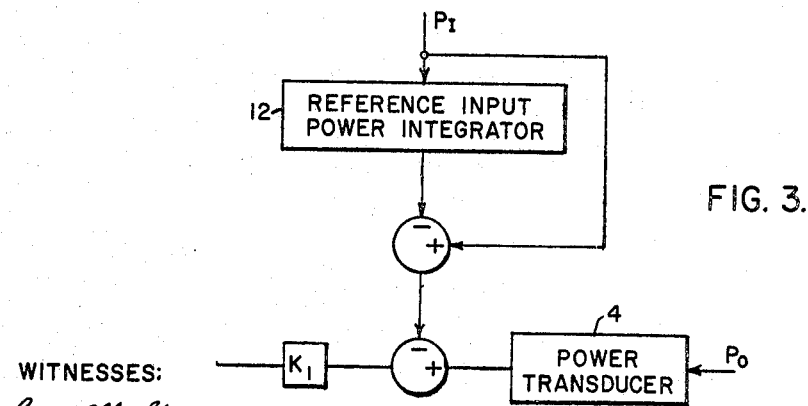
FIG. 3 is a block diagram showing how the stabilizing circuit may override deliberate changes in the input power to the synchronous generator.

FIG. 3 is a block diagram which illustrates the modification which may be made to the system of FIG. 2, to allow the input power to the generator to be changed with only minor output voltage variations. The input power signal $P_I$, which may be derived from a potentiometer as hereinbefore mentioned, is fed into a time delay circuit, such as reference input power integrator 12, to obtain a reference signal. The reference signal is then subtracted from signal $P_I$, to obtain a signal proportional to any change in the input power. The signal proportional to any change in the input power is then subtracted from the signal from the power transducer 4, and the resulting signal fed to amplifier $K_1$, as hereinbefore described.

I claim as my invention:

1. A stabilizing circuit for an alternating current generator having output terminals connected to a load circuit, and a field winding connected to excitation means, comprising:
    means providing a first signal responsive to the instantaneous real power output of the alternating current generator,
    means providing a second signal responsive to any change in the input power to the alternating current generator,
    means subtracting said second signal from said first signal to provide a third signal,
    means providing a fourth signal responsive to the steady state real power output of the alternating current generator,
    means providing a fifth signal responsive to the difference between said third and fourth signals,
    and means providing a sixth signal responsive to the integral of said fifth signal, said sixth signal being a stabilizing signal which may be applied to the excitation means to stabilize the alternating current generator during changes in its output power.

2. The stabilizing circuit of claim 1 wherein said second signal is obtained by means providing an input power signal responsive to the power input to the alternating current generator, means integrating said input power signal, and means subtracting said integrated signal from said input power signal.

3. A control system for an alternating current generator having a field winding, and output terminals connected to a load circuit, comprising:
    excitation means adapted to provide excitation current for the field winding of said alternating current generator,
    regulator means providing a voltage correction signal responsive to the deviation of the output voltage of the alternating current generator from the desired magnitude,
    stabilizing means providing a stabilizing signal responsive to the integral of the deviation of the instantaneous real power output from the steady state real power output of the alternating current generator,
    said stabilizing means including means providing a first signal responsive to the instantaneous real power output of the alternating current generator, means providing a second signal responsive to any change in input power to the alternating current generator, means subtracting the second signal from the first signal to provide a third signal, means modifying said first signal to provide a fourth signal responsive to the steady state real power output of the alternating current generator, and means integrating the deviation of said third signal from said fourth signal to provide said stabilizing signal,
    and means adding said voltage correction signal and said stabilizing signal, and applying the resulting signal to said excitation means, to control the magnitude of the excitation current provided by said excitation means.

4. The control system of claim 3 wherein the second signal responsive to change in input power is obtained by means providing an input power signal responsive to the power input to the alternating current generator, means integrating said input power signal, and means subtracting said integrated signal from said input power signal.

References Cited

UNITED STATES PATENTS 2,981,882   4/1961   Rosenblatt _____ 322—24
3,377,548   4/1968   Newbold _____ 318—20.395 X ORIS L. RADER, Primary Examiner H. HUBERFELD, Assistant Examiner U.S. Cl. X.R.

318—18; 322—24, 25, 28